United States Patent
Zhu et al.

(10) Patent No.: US 12,502,657 B1
(45) Date of Patent: Dec. 23, 2025

(54) MOLECULAR SIEVE CONFINED NOBLE METAL CATALYST FOR CO-SCR DENITRIFICATION, PREPARATION METHOD AND APPLICATION THEREOF

(71) Applicant: Institute of Process Engineering, Chinese Academy of Sciences, Beijing (CN)

(72) Inventors: Tingyu Zhu, Beijing (CN); Wenqing Xu, Beijing (CN); Yixi Wang, Beijing (CN); Wanrong Chen, Beijing (CN); Yang Yang, Beijing (CN)

(73) Assignee: Institute of Process Engineering, Chinese Academy of Sciences, Beijing (CN)

( * ) Notice: Subject to any disclaimer, the term of this patent is extended or adjusted under 35 U.S.C. 154(b) by 0 days.

(21) Appl. No.: 19/258,795

(22) Filed: Jul. 2, 2025

(30) Foreign Application Priority Data

Oct. 31, 2024 (CN) .......................... 202411538482.6

(51) Int. Cl.
*B01J 29/068* (2006.01)
*B01D 53/86* (2006.01)
(Continued)

(52) U.S. Cl.
CPC ........ *B01J 23/468* (2013.01); *B01D 53/8628* (2013.01); *B01D 53/9418* (2013.01);
(Continued)

(58) Field of Classification Search
CPC ...... B01J 23/468; B01J 29/068; B01J 29/123; B01J 29/126; B01J 29/7407; B01J 35/45;
(Continued)

(56) References Cited

U.S. PATENT DOCUMENTS 7,306,824 B1 * 12/2007 Coker ................... B82Y 30/00
427/229
7,767,610 B1 * 8/2010 Coker ................. B01J 37/0203
502/64
(Continued)

FOREIGN PATENT DOCUMENTS

CN 113559916 A 10/2021
CN 115283007 A 11/2022
(Continued)

OTHER PUBLICATIONS

Notice of first Office action dated Mar. 14, 2025 in SIPO application No. CN202411538482.6, 11 pages.
(Continued)

*Primary Examiner* — Cam N. Nguyen
(74) *Attorney, Agent, or Firm* — Cooper Legal Group, LLC

(57) ABSTRACT

A molecular sieve confined noble metal catalyst for CO-SCR denitrification, a preparation method and an application thereof are provided. The catalyst includes a molecular sieve carrier and Ir metal nanoclusters loaded in the molecular sieve carrier through confined encapsulation. The preparation method includes the following steps: mixing a first metal precursor solution with a first ligand to obtain a first mixed solution; mixing a second metal precursor solution with a second ligand to obtain a second mixed solution; mixing a silicon source, an aluminum source, an alkali and a solvent to obtain a molecular sieve precursor solution; mixing the molecular sieve precursor solution with the first mixed solution, then adding the second mixed solution for hydrothermal crystallization reaction, and then centrifugally washing, drying and calcining to obtain the catalyst.

6 Claims, 4 Drawing Sheets

(51) Int. Cl.
*B01D 53/94* (2006.01)
*B01J 23/46* (2006.01)
*B01J 29/74* (2006.01)
*B01J 35/30* (2024.01)
*B01J 35/45* (2024.01)
*B01J 37/03* (2006.01)
*B01J 37/04* (2006.01)
*B01J 37/06* (2006.01)
*B01J 37/08* (2006.01)
*F01N 3/20* (2006.01)
*F01N 3/28* (2006.01)

(52) U.S. Cl.
CPC ......... *B01J 29/7407* (2013.01); *B01J 35/393* (2024.01); *B01J 35/45* (2024.01); *B01J 37/033* (2013.01); *B01J 37/04* (2013.01); *B01J 37/06* (2013.01); *B01J 37/086* (2013.01); *B01J 37/088* (2013.01); *F01N 3/2066* (2013.01); *F01N 3/2803* (2013.01); *B01D 2251/204* (2013.01); *B01D 2255/1028* (2013.01); *B01D 2257/404* (2013.01); *F01N 2370/02* (2013.01)

(58) Field of Classification Search
CPC ........ B01J 35/393; B01J 37/033; B01J 37/04; B01J 37/06; B01J 37/086; B01J 37/088; F01N 3/2066; F01N 3/2803
See application file for complete search history.

(56) References Cited

U.S. PATENT DOCUMENTS 10,618,003 B2 * 4/2020 Rajaram ............... B01J 29/743
10,898,883 B2 * 1/2021 Hu ....................... C07C 29/132

2001/0053745 A1 * 12/2001 Kharas ................. B01J 29/068
502/355
2024/0399346 A1 * 12/2024 Zhu ......................... B01J 37/04

FOREIGN PATENT DOCUMENTS

| CN | 115814847 A | 3/2023 |
|---|---|---|
| CN | 116832855 A | 10/2023 |
| CN | 117324026 A | 1/2024 |
| WO | 2019095985 A1 | 5/2019 |
| WO | 2021003947 A1 | 1/2021 |

OTHER PUBLICATIONS

Retrieval report-First search dated Mar. 14, 2025 in SIPO application No. CN202411538482.6, 6 pages.
Notification to Grant Patent Right for Invention dated Mar. 31, 2025 in SIPO application No. CN202411538482.6, 3 pages.
Retrieval report—Supplementary search dated Mar. 26, 2025 in SIPO application No. CN202411538482.6, 4 pages.
Liu et al. , "Unraveling the Synergistic Mechanism of Ir Species with Various Electron Densities over an Ir/ZSM-5 Catalyst Enables High-Efficiency NO Reduction by CO", Environ. Sci. Technol. Jun. 18, 2024 , Abstract , Section 2, vol. 58, 9 pages.
Yanping, et al., "Selective Catalytic Reduction of NOx by Hydrocarbons over Copper-Free Metal Supported Zeolite", Progress in Chemistry, Dec. 24, 2013, Issue 12, 9 pages with English abstract.
Darui, et al., "Preparation and Catalytic Performance of Noble Metal Loaded Core-Shell Structured Catalyst", Chemical Reaction Engineering and Technology, Aug. 25, 2017, Issue 4, 9 pages, English abstract on p. 9.
Xiao-Jiang, et al., "Research Progress of Ceria-Based Catalysts in the Selective Catalytic Reduction of NOx by NH3", Acta Physico-Chimica Sinica, May 15, 2015, Issue 5, 12 pages with English abstract.

* cited by examiner

MOLECULAR SIEVE CONFINED NOBLE METAL CATALYST FOR CO-SCR DENITRIFICATION, PREPARATION METHOD AND APPLICATION THEREOF

CROSS-REFERENCE TO RELATED APPLICATIONS

This application claims priority to Chinese Patent Application No. 202411538482.6, filed on Oct. 31, 2024, the contents of which are hereby incorporated by reference.

TECHNICAL FIELD

The disclosure relates to the technical field of catalytic reduction of nitrogen oxides, in particular to a molecular sieve confined noble metal catalyst for CO-SCR denitrification, a preparation method and an application thereof.

BACKGROUND

The sources of man-made nitrogen oxides are mainly concentrated in motor vehicle exhaust emissions, power plants and industrial exhaust emissions. Nitrogen oxides not only do harm to the environment, but also have potential harm to human health and ecosystem. Therefore, it is extremely important to control nitrogen oxides ($NO_x$) emitted from stationary sources and mobile sources. At present, ammonia selective catalytic reduction ($NH_3$-SCR) technology is the main technology to treat nitrogen oxides, namely, ammonia ($NH_3$) is used as reducing agent, and $NO_x$ are selectively converted into harmless $N_2$ by catalyst. However, $NH_3$ may lead to ammonia escaping and secondary pollution. Therefore, CO-SCR technology, using the original CO in flue gas as reducing agent, has attracted more and more attention. CO-SCR technology has the characteristics of less secondary pollution and simple operation.

The problem to be solved when CO-SCR catalyst is put into industrial application is that $O_2$ and $SO_2$ in flue gas will lead to catalyst deactivation. Studies have shown that Ir-based catalysts have higher activity than other catalysts under oxygen-containing conditions. When Ir is used as an active metal, the main roles are the oxidation state of $Ir^{\delta+}$ site and the metal state of $Ir^0$ site. The high catalytic activity of Ir-based catalysts for CO-SCR reaction is mainly realized by the synergistic effect of $Ir^{\delta+}$ and $Ir^0$, where the oxidized $Ir^{\delta+}$ is more likely to selectively adsorb NO, then form an ONNO intermediate, and then overflow to the neighboring $Ir^0$ to react with CO to form $N_2$. A certain proportion of oxidized $Ir^{\delta+}$ sites and metallic $Ir^0$ may improve the reaction activity.

However, the Ir-based catalysts in the prior art have some problems, such as low utilization rate of active metals, difficult adjustment of active sites, poor oxygen and sulfur resistance and poor catalyst stability, which limit the further application of Ir-based catalysts. How to improve these problems and provide Ir-based catalysts with better performance has become a difficult problem that technicians in this field need to overcome urgently.

SUMMARY

The object of the disclosure is to provide a molecular sieve confined noble metal catalyst for CO-SCR denitrification, a preparation method and an application thereof, so as to solve the problems existing in the prior art. According to the disclosure, through the one-pot hydrothermal method of in-situ synthesis-ligand protection, metals are introduced into the molecular sieve synthesis, and the ligands are used to guide the anchoring of metal nanoclusters in the molecular sieve, and the formation of the molecular sieve structure is accelerated. The method for preparing the catalyst provided by the disclosure is simple and convenient to operate, and the preparation time is shortened; in the preparation method, only water is used as a solvent, which reduces the emission of harmful substances. The molecular sieve carrier of the prepared catalyst has high hydrothermal stability, and the occurrence state of active components is adjustable, which optimizes the utilization rate of metals and enhances the stability and catalytic activity of the catalyst in harsh environment.

In order to achieve the above objective, the present disclosure provides the following schemes:

one of the technical schemes of the disclosure: a molecular sieve confined noble metal catalyst for CO-SCR denitrification, the molecular sieve confined noble metal catalyst for CO-SCR denitrification includes a molecular sieve carrier and Ir metal nanoclusters (Ir metal nanoclusters are used as active components of the catalyst) loaded in the molecular sieve carrier through confined encapsulation.

Namely, the catalyst is a molecular sieve with confined encapsulated Ir metal nanoclusters.

In an embodiment, the molecular sieve carrier is an A-type molecular sieve, an X-type molecular sieve or a Y-type molecular sieve; the loading of the Ir metal nanoclusters in the molecular sieve confined noble metal catalyst is 0.1-1 weight percent (wt. %); and the particle size of the Ir metal nanoclusters is ≤2 nanometers (nm).

In an embodiment, the Ir metal nanoclusters include Ir metal nanoclusters with a particle size of <0.8 nm and Ir metal nanoclusters with a particle size of 1-2 nm.

In an embodiment, the Ir metal nanoclusters include an oxidized state of $Ir^{\delta+}$ and a metallic state of $Ir^0$, where the proportion of $Ir^0$ is 10-70 wt. %.

In an embodiment, the molecular sieve has a cage structure. The molecular sieve is rich in aluminum hydroxyl and silicon hydroxyl sites.

The general chemical formula of molecular sieve is $M_2O \cdot Al_2O_3 \cdot xSiO_2 \cdot yH_2O$, where M is monovalent cation, such as $K^+$, $Na^+$, etc.

The second technical scheme of the disclosure: a method for preparing the molecular sieve confined noble metal catalyst for CO-SCR denitrification includes the following steps:

mixing a first metal precursor solution with a first ligand, and stirring to obtain a first mixed solution;

mixing a second metal precursor solution with a second ligand, and stirring to obtain a second mixed solution;

mixing silicon source, aluminum source, alkali and solvent, and stirring to obtain molecular sieve precursor solution; mixing the molecular sieve precursor solution with the first mixed solution and stirring, then adding the second mixed solution and stirring to obtain a third mixed solution;

carrying out hydrothermal crystallization reaction on the third mixed solution, and after the hydrothermal crystallization reaction is finished, carrying out centrifugal washing, drying and calcination to obtain the molecular sieve confined noble metal catalyst for CO-SCR denitrification; and the first metal precursor solution and the second metal precursor solution are both Ir salt solutions.

In the preparation process, the type of the obtained molecular sieve may be controlled by adjusting the silicon-aluminum ratio (molar ratio of silicon source to aluminum source) and the hydrothermal crystallization reaction time (namely, controlling whether the molecular sieve is A-type molecular sieve, X-type molecular sieve or Y-type molecular sieve).

In an embodiment, the concentration of Ir in the first metal precursor solution is 0.1-10 grams per liter (g/L); the concentration of Ir in the second metal precursor solution is 0.1-10 g/L.

In an embodiment, the concentrations of the first metal precursor solution and the second metal precursor solution are the same.

In an embodiment, the solvent is water.

In an embodiment, the first ligand is a C1-6 linear amine compound; the second ligand is alkoxy silane containing sulfhydryl or amino group; the Ir salt solution includes at least one of iridium nitrate, iridium acetate, and chloroiridic acid, optionally chloroiridic acid; and water is used as the solvent.

In an embodiment, the first ligand is optionally at least one of ethylenediamine, 1,3-propanediamine and mercaptoethylamine, more optionally 1, 3-propanediamine; the second ligand is optionally at least one of (3-mercaptopropyl) trimethoxysilane, (3-mercaptopropyl) triethoxysilane, (3-aminopropyl) trimethoxysilane, (3-aminopropyl) triethoxysilane and N-(2-aminoethyl)-3-aminopropyl trimethoxysilane, more optionally, (3-aminopropyl) trimethoxysilane.

According to the disclosure, sulfhydryl groups or amino groups on the first ligand and the second ligand are combined with the metal precursor (Ir salt), and the sulfhydryl groups and amino groups are easy to coordinate with the metal to form a relatively stable complex, so the metal precursor is prevented from precipitating in the alkaline environment of molecular sieve synthesis, and make sure that the metal precursor may enter the molecular sieve. The alkoxysilane part of the second ligand hydrolytically combines with the silicon hydroxyl group of silicon source and the aluminum hydroxyl group of aluminum source to form covalent bonds, which promotes the formation of molecular sieve and the localized encapsulation of metal nanoclusters.

In an embodiment, the aluminum source includes at least one of sodium metaaluminate ($NaAlO_2$), bochmite ($AlOOH·nH_2O$), pseudo-bochmite ($AlOOH·nH_2O$), amorphous aluminum hydroxide powder ($Al(OH)_3$) and aluminum isopropoxide ($C_9H_{21}AlO_3$), optionally sodium metaaluminate and/or aluminum isopropoxide; the silicon source includes at least one of water glass ($Na_2O·nSiO_2$), silica sol ($SiO_2·nH_2O$), silica gel (($C_2H_6OSi$)n) and amorphous $SiO_2$ powder, optionally silica sol and/or silica gel; the alkali is NaOH and/or KOH, optionally NaOH.

In an embodiment, the molar ratio of the Ir salt (namely, the Ir contained in the Ir salt) to the first ligand in the first mixed solution is 1:3-8, based on Ir; the molar ratio of the Ir salt to the second ligand in the second mixed solution is 1:6-12.

In an embodiment, the silicon source is calculated as $SiO_2$, the aluminum source is calculated as $Al_2O_3$, the alkali is calculated as $Na_2O$ and/or $K_2O$, and the Ir salt is calculated as Ir, and the molar ratio of the silicon source, the aluminum source, the alkali, the Ir salt, the first ligand and the second ligand in the third mixed solution is 1-8:1: 1-4:0.003-0.020:0.001-0.16:0.001-0.24. According to the molar ratio, in the reaction system formed by the third mixed solution, $SiO_2$: $Al_2O_3$: $Na_2O$ and/or $K_2O$: Ir: first ligand: second ligand=1-8:1: 1-4:0.003-0.020:0.001-0.16:0.001-0.24.

In an embodiment, the molar ratio of silicon source, aluminum source and solvent (water) in the molecular sieve precursor solution is 1-8:1: 100-140.

In an embodiment, the stirring temperature is 20-50 degrees Celsius (° C.), optionally 20° C., 25° C., 30° C., 35° C., 40° C. or 50° C., and more optionally 30° C.

In an embodiment, when the first metal precursor solution is mixed with the first ligand, the stirring time is 0.5-2 hours (h), optionally 0.5 h, 1 h, 1.5 h or 2 h, and more optionally 0.5 h; when the second metal precursor solution is mixed with the second ligand, the stirring time is 0.5-2 h, optionally 0.5 h, 1 h, 1.5 h or 2 h, more optionally 0.5 h; when the molecular sieve precursor solution is mixed with the first mixed solution, the stirring time is 0.1-1 h, optionally 0.1 h, 0.5 h or 1 h, more optionally 0.5 h; and after the second mixed solution is added, the stirring time is 1-4 h, optionally 1 h, 2 h, 3 h or 4 h, and more optionally 3 h.

In an embodiment, the specific operation of mixing and stirring the silicon source, the aluminum source, the alkali and the solvent to obtain the molecular sieve precursor solution is as follows: mixing aluminum source, alkali and half solvent, and stirring to obtain aluminum alkali solution; mixing the silicon source with the other half solvent, and stirring to obtain a silicon source solution; and mixing and stirring the aluminum alkali solution and the silicon source solution to obtain the molecular sieve precursor solution.

In an embodiment, the mixing time of aluminum source, alkali and half solvent, mixing time of silicon source and another half solvent, and mixing time of aluminum alkali solution and silicon source solution are all 0.1-1 h, optionally 0.1-1 h, 0.5 h or 1 h, more optionally 0.5 h.

In an embodiment, the temperature of the hydrothermal crystallization reaction is 80-120° C., and the time is 3-48 h; the drying temperature is 80-120° C.; and the calcination temperature is 400-600° C., the time is 4-8 h, and the heating rate is 1-10 degrees Celsius per minute (C/min).

In an embodiment, the temperature of the hydrothermal crystallization reaction is optionally 80° C., 90° C., 100° C., 110° C. or 120° C., more optionally 100° C.; the time is optionally 3 h, 4 h, 6 h, 12 h or 48 h, more optionally 4 h.

In an embodiment, the drying temperature is optionally 80° C., 90° C., 100° C., 110° C. or 120° C., more optionally 100° C.

In an embodiment, the calcination temperature is optionally 400° C., 450° C., 500° C., 550° C. or 600° C., more optionally 550° C.; the time is optionally 4 h, 5 h, 6 h, 7 h or 8 h, more optionally 6 h; and the heating rate is optionally 1° C./min, 2° C./min, 5° C./min or 10° C./min, more optionally 2° C./min.

In an embodiment, the alkali liquor obtained after the hydrothermal crystallization reaction is the molecular sieve encapsulating Ir metal nanoclusters, and the rotational speed of centrifugal washing is 4000-10000 revolutions per minute (rpm), optionally 4000 rpm, 5000 rpm, 6000 rpm, 7000 rpm, 8000 rpm, 9000 rpm or 10000 rpm, and more optionally 4000 rpm.

In an embodiment, the number of times of centrifugal washing is 3-5 times.

In an embodiment, the time for each centrifugal washing is 5-10 minutes (min), optionally 5 min, 6 min, 7 min, 8 min, 9 min or 10 min, more optionally 5 min.

In an embodiment, the temperature of centrifugal washing is room temperature, the solvent is water, and the potential of Hydrogen (pH) of the precipitate after centrifugal washing is 8-10.

In the process of centrifugal washing, excess impurities such as alkali are washed away, leaving pure catalyst precipitation.

In an embodiment, the drying is carried out in an air atmosphere.

In an embodiment, the calcination is carried out in an air atmosphere.

The disclosure uses a method that a double ligand and a metal precursor solution are respectively combined first to obtain a first mixed solution and a second mixed solution, and then the first mixed solution and the second mixed solution are added to the molecular sieve precursor solution step by step for mixing. Firstly, the double ligands are combined with the metal precursor solution respectively, so the metal ions may be fully combined with the ligands in the subsequent process, and the initial formation of metal nanoclusters is completed; a molecular sieve of type A, X or Y is generated through the mixing reaction of the molecular sieve precursor solution with the first mixed solution and the second mixed solution, and the complex formed by ligand and metal ions enters into the A, X or Y molecular sieve being crystallized, and the alkoxysilane part of ligand combines with the silicon hydroxyl of silicon source or aluminum hydroxyl of aluminum source to form Si—O—Si bond or Si—O—Al bond, which accelerates the formation of molecular sieve crystal structure. In the process of centrifugal washing, excess impurities such as alkali are washed away, leaving pure catalyst precipitation. After drying and calcining in high-temperature air, ligands and other substances are fully decomposed to obtain A, X or Y molecular sieve catalyst with localized encapsulation of Ir metal clusters. The preparation process of the catalyst is simple, easy to operate and has little environmental pollution.

The first ligand in the double ligand is C1-6 linear amine compound, and the second ligand is alkoxy silane containing sulfhydryl or amino group. The molecule of the first ligand is small and flexible, and the lone pair on the nitrogen atom in the amino group forms a coordination bond with the metal ion to guide the metal into the pores of the molecular sieve. The second ligand is a bifunctional ligand with large molecules and branched chains, which preferentially occupies the macroporous or super-cage structure in the molecular sieve. The sulfur element in the sulfhydryl group of the second ligand and the nitrogen element in the amino group have high electron cloud density, strong electronegativity and strong affinity with positively charged metal ions, so they preferentially bind with metal ions. The alkoxy silane part of bifunctional ligand combines with the silicon hydroxyl group of silicon source and the aluminum hydroxyl group of aluminum source to form Si—O—Si bond or Si—O—Al bond, which accelerates the formation of molecular sieve structure. The particle size of metal clusters in the synthesized catalyst is mainly limited to <0.8 nm and 1-2 nm, which is influenced by the proportion of ligands, the cage diameter of molecular sieve or the pore size, and the metal utilization rate is optimized while the metal loading is low.

The third technical scheme of the disclosure: the application of the molecular sieve confined noble metal catalyst for CO-SCR denitrification in catalyzing the selective reduction of nitrogen oxides by carbon monoxide (CO) in flue gas of stationary source or tail gas of mobile source (namely, the application in CO-SCR reaction).

In an embodiment, the nitrogen oxides in the stationary source flue gas or the mobile source tail gas include NO (the molecular sieve confined noble metal catalyst for CO-SCR denitrification plays a selective catalytic reduction role on NO in the nitrogen oxides); and the stationary source flue gas and/or the mobile source tail gas also contain $O_2$ and $SO_2$.

In an embodiment, the concentration of NO in the stationary source flue gas or mobile source tail gas is 50-500 parts per million (ppm), optionally 50 ppm, 100 ppm, 150 ppm, 200 ppm, 250 ppm, 400 ppm or 500 ppm, and more optionally 400 ppm.

In an embodiment, the concentration of CO in the stationary source flue gas or mobile source tail gas is 400-10000 ppm, optionally 400 ppm, 500 ppm, 600 ppm, 700 ppm, 800 ppm, 900 ppm or 1000 ppm, and more optionally 400 ppm.

In an embodiment, the concentration of $O_2$ in the stationary source flue gas or the mobile source tail gas is 0-15 volume percentage (vol. %) and is not 0; the concentration of $SO_2$ in the stationary source flue gas or the mobile source tail gas is 0-400 ppm and is not 0.

In an embodiment, the concentration of $O_2$ in the stationary source flue gas or the mobile source tail gas is optionally 1 vol. %, 2 vol. %, 3 vol. %, 4 vol. %, 5 vol. %, 10 vol. % or 15 vol. %, more optionally 5 vol. %; and the concentration of $SO_2$ in the stationary source flue gas or the mobile source tail gas is optionally 50 ppm, 100 ppm, 200 ppm, 300 ppm or 400 ppm, and more optionally 100 ppm.

In an embodiment, the molecular sieve confined noble metal catalyst for CO-SCR denitrification catalyzes the selective reduction of nitrogen oxides by carbon monoxide in stationary source flue gas or mobile source tail gas at a reaction temperature of 150-400° C., optionally 150° C., 200° C., 250° C., 300° C., 350° C. or 400° C.

In an embodiment, before the catalyst is used to catalyze the selective reduction of nitrogen oxides by carbon monoxide in flue gas of stationary source or tail gas of mobile source (i.e. before the CO-SCR reaction), it also includes pretreating the catalyst, specifically: the catalyst is pretreated in a mixed atmosphere of $H_2/N_2$ at 200° C. for 20-60 min, and the proportion of hydrogen in the mixed atmosphere of $H_2/N_2$ is 1-10 vol. %, optionally 1 vol. %, 2 vol. %, 3 vol. %, 4 vol. %, 5 vol. % or 10 vol. %, and more optionally 5 vol. %.

In an embodiment, the pretreatment time is optionally 20 min, 30 min, 40 min, 50 min or 60 min, more optionally 30 min.

The disclosure provides a catalyst for selective catalytic reduction of nitrogen oxides, and a preparation method and an application thereof. By confining Ir metal nanoclusters in a molecular sieve interior, the problems of low utilization rate of active metals, difficult adjustment of active sites, poor oxygen and sulfur resistance, poor catalyst stability and the like of the existing catalyst for selective catalytic reduction of nitrogen oxides are solved, and at the same time, the problems of complex preparation process, long preparation period, high cost and the like are also solved. The obtained catalyst has improved catalytic activity and stability, and has a broad application prospect.

In an Ir-based catalyst, a certain proportion of oxidized $Ir^{\delta+}$ sites and metallic $Ir^0$ may improve the reaction activity. According to the disclosure, the proportion of Ir in two valence states is controlled by the particle size and distribution of Ir metal nanoclusters, and the larger the cluster particles are, the higher the proportion of metallic $Ir^0$ is. According to the disclosure, the cluster is limited and encapsulated in the molecular sieve interior by an in-situ synthesis method, so the particle size and dispersion of the metal cluster may be effectively controlled. A, X or Y molecular sieve is a kind of material with uniform pore structure and high crystallinity, which has the characteristics of high specific surface area, excellent hydrothermal stability and chemical stability, and is used as a carrier for anchoring and dispersing metal active sites. The framework structure of A, X or Y molecular sieves is composed of silicon-oxygen tetrahedron and aluminum-oxygen tetrahedron. On the basis of silicon-oxygen tetrahedron and aluminum-oxygen tetrahedron, three-dimensional β-cage and α-cage structures are further formed, which may accommodate metal clusters. In the disclosure, two different ligands are used to introduce Ir clusters into different sites in the molecular sieve step by step to regulate and control the size and distribution of Ir clusters. Among them, the geometry and size of the first ligand make it tend to build clusters (<0.8 nm) in smaller pores in the molecular sieve, while the size of the second ligand makes it build larger clusters (1-2 nm) in the super cage of the molecular sieve.

Ir-based catalysts are easily oxidized to $Ir^{\delta+}$ by $O_2$ during the reaction, which leads to the destruction of the balance between $Ir^{\delta+}$ and $Ir^0$ and the decrease of the synergistic effect, thus reducing the reaction activity. The existence of $SO_2$ in flue gas may promote the transformation of $Ir^{\delta+}$ to $Ir^0$. Different concentrations of $SO_2$ have different effects. Under the joint action of 02 and $SO_2$, the ratio of $Ir^{\delta+}$ to $Ir^0$ may be balanced. Therefore, aiming at the flue gas with different $O_2$: $SO_2$ ratios, the Ir content introduced by the first ligand and the second ligand may be adjusted respectively, and then the cluster size may be adjusted.

The disclosure discloses the following technical effects.

The molecular sieve confined noble metal catalyst for CO-SCR denitrification designed by the disclosure realizes the regulation of the proportion of different occurrence states of active sites, thereby improving the selective catalytic reduction ability of metal sites for nitrogen oxides.

According to the disclosure, a one-pot hydrothermal method of in-situ synthesis-ligand protection is adopted to prepare the catalyst, and metal clusters with different particle sizes are introduced by adding two ligands step by step in the synthesis process, so the operation is easy, the preparation time is short, and the catalyst has the potential of large-scale industrial application; and the product of complete catalytic reduction of nitrogen oxides is nitrogen, which is beneficial to reducing environmental pollution.

The molecular sieve confined noble metal catalyst for CO-SCR denitrification prepared by the disclosure has excellent catalytic activity, which is obviously improved compared with the existing catalyst, and overcomes the problem of low stability of common single metal catalysts, and has excellent industrial application potential.

BRIEF DESCRIPTION OF THE DRAWINGS

In order to explain the embodiments of the present disclosure or the technical scheme in the prior art more clearly, the drawings needed in the embodiments will be briefly introduced below. Obviously, the drawings described below are only some embodiments of the present disclosure, and other drawings may be obtained according to these drawings without creative work for ordinary people in the field.

DETAILED DESCRIPTION OF THE EMBODIMENTS

Figure 1:
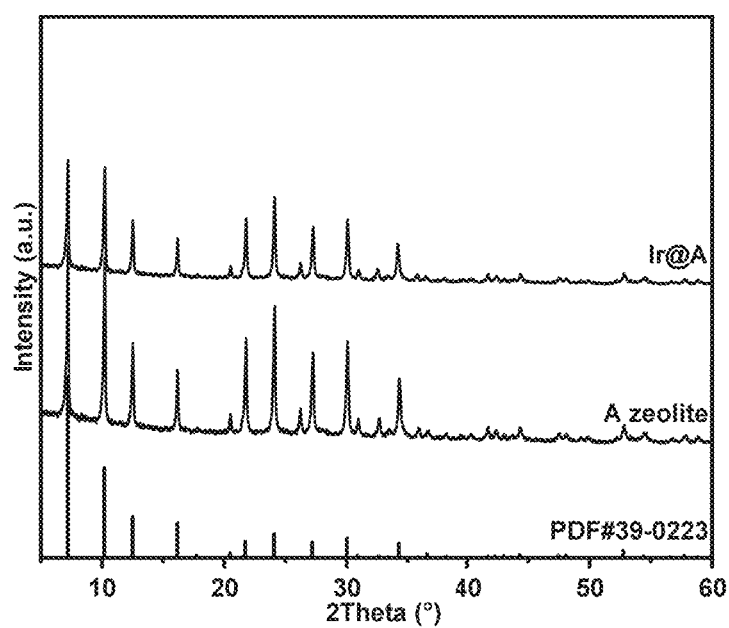
FIG. 1 is an XRD spectrum of catalysts prepared in Embodiment 3 and Comparative Example 1.

A number of exemplary embodiments of the present disclosure will now be described in detail, and this detailed description should not be considered as a limitation of the present disclosure, but should be understood as a more detailed description of certain aspects, characteristics and embodiments of the present disclosure.

It should be understood that the terminology described in the present disclosure is only for describing specific embodiments and is not used to limit the present disclosure. In addition, for the numerical range in the present disclosure, it should be understood that each intermediate value between the upper limit and the lower limit of the range is also specifically disclosed. Intermediate values within any stated value or stated range, as well as each smaller range between any other stated value or intermediate values within the stated range are also included in the present disclosure. The upper and lower limits of these smaller ranges may be independently included or excluded from the range.

Unless otherwise specified, all technical and scientific terms used herein have the same meaning as commonly understood by one of ordinary skill in the art to which this disclosure relates. Although the present disclosure only describes the preferred methods and materials, any methods and materials similar or equivalent to those described herein may also be used in the practice or testing of the present disclosure. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present disclosure without departing from the scope or spirit of the present disclosure. Other embodiments will be apparent to the skilled person from the description of the disclosure. The description and embodiments of the present disclosure are exemplary only.

The terms "including", "comprising", "having" and "containing" used in this disclosure are all open terms, which means including but not limited to.

Where the specific technology or conditions are not specified in the specific embodiment of the present disclosure, it shall be carried out according to the conventional technology or conditions in the field or according to the product specification. The raw materials or instruments used are conventional products that may be purchased through regular channels if the manufacturer is not indicated.

The room temperature referred to in the specific embodiment of the present disclosure specifically refers to 20-30 degrees Celsius (° C.).

The Ir salt (metal precursor), the first ligand, the second ligand, the aluminum source, the silicon source and the alkali involved in the specific embodiment of the present disclosure may be equally substituted within the scope defined by the present disclosure, without affecting the realization of the technical effect.

Embodiment 1

A type A molecular sieve confined noble metal catalyst for CO-SCR denitrification includes the following preparation steps:

S1. dissolving 1 gram (g) of chloroiridium hexahydrate (with an Ir content of 39 weight percent (wt. %)) in water to prepare 100 milliliter (mL) of chloroiridium solution (with an Ir concentration of 3.9 grams per liter (g/L)); (as a first metal precursor solution and a second metal precursor solution);

S2. mixing 8.50 mL of chloroiridium acid solution (where Ir is 0.033 g, namely, 0.172 millimole (mmol)) (first metal precursor solution) with 0.08 g (1.1 mmol) of 1,3-propanediamine (first ligand), and stirring at 30° C. for 0.5 hours (h) to obtain a first mixed solution;

S3. mixing 2.80 mL of chloroiridium acid solution (where Ir is 0.011 g, namely, 0.057 mmol) (second metal precursor solution) with 0.065 g (0.4 mmol) (3-aminopropyl) trimethoxysilane (second ligand), and stirring at 30° C. for 0.5 h to obtain a second mixed solution;

S4. dissolving 1.2 g (0.03 mole (mol)) of sodium hydroxide (alkali) and 2.5 g (0.03 mol) of sodium metaaluminate (aluminum source) in 12 mL (0.67 mol) of deionized water, and stirring at 30° C. for 0.5 h to obtain an aluminum alkali solution; mixing 6 g of silica sol (containing 0.03 mol of $SiO_2$) with 15 mL (0.83 mol) of deionized water, and stirring at 30° C. for 0.5 h to obtain a silica source solution; mixing the aluminum alkali solution and the silicon source solution, and stirring at 30° C. for 0.5 h to obtain a molecular sieve precursor solution; and mixing the molecular sieve precursor solution with the first mixed solution, stirring at 30° C. for 0.5 h, adding the second mixed solution, and continuously stirring at 30° C. for 3 h to obtain a third mixed solution;

S5. carrying out hydrothermal crystallization reaction on the third mixed solution at 100° C. for 4 h to obtain a suspension; and S6. using water as a centrifugal washing solvent, centrifugally washing the suspension for 5 times, where the centrifugal rotation speed is 4000 revolutions per minute (rpm), and the centrifugal washing time is 5 minutes (min) each time; then, drying the solid product obtained by centrifugal washing (potential of Hydrogen (pH) 8-10 detected by pH test paper) in the air atmosphere of 100° C., grinding in a mortar for 5 min, and calcining the ground sample in an air atmosphere at 550° C. for 6 h at a heating rate of 2 degrees Celsius per minute (° C./min), to obtain a type A molecular sieve confined noble metal catalyst for CO-SCR denitrification (the Ir loading in the catalyst prepared in this embodiment is 0.83 wt. % by ICP test).

Embodiment 2

Compared with Embodiment 1, the difference is that the amounts of the first metal precursor solution, the second metal precursor solution, the first ligand and the second ligand are 5.6 mL, 5.6 mL, 0.053 g and 0.13 g, respectively (according to ICP test, the Ir loading in the catalyst prepared in this embodiment is 0.81 wt. %).

Embodiment 3

Compared with Embodiment 1, the difference is that the amounts of the first metal precursor solution, the second metal precursor solution, the first ligand and the second ligand are 2.8 mL, 8.5 mL, 0.027 g and 0.194 g, respectively (by ICP test, the Ir loading in the catalyst prepared in this embodiment is 0.79 wt. %).

Comparative Example 1

The preparation of pure A-type molecular sieve includes the following steps:

dissolving 1.2 g of sodium hydroxide and 2.5 g of sodium metaaluminate in 12 mL of deionized water and stirring at 30° C. for 0.5 h to obtain an aluminum alkali solution; mixing 6 g of silica sol with 15 mL of deionized water, and stirring at 30° C. for 0.5 h to obtain a silicon source solution; mixing the Silicon aluminum alkali solution and the silicon source solution, and stirring at 30° C. for 0.5 h to obtain a molecular sieve precursor solution; carrying out hydrothermal crystallization of molecular sieve precursor solution at 100° C. for 4 h, then using water as centrifugal washing solvent, centrifugally washing the products of hydrothermal crystallization reaction for 5 times, with a centrifugal speed of 4000 rpm and a centrifugal washing time of 5 min; subsequently, drying the centrifugal washing product in an air atmosphere of 100° C., then grounding for 5 min, and the ground sample is calcined in an air atmosphere of 550° C. for 6 h, the heating rate is 2° C./min, thus obtaining pure A-type molecular sieve.

Comparative Example 2

The preparation steps of the catalyst are as follows:

S1. dissolving 1 g of chloroiridium hexahydrate (with an Ir content of 39 wt. %) in water to prepare 100 mL chloroiridium solution;

S2. mixing 11.50 mL of chloroiridium acid solution with 0.10 g of 1,3-propanediamine, and stirring at 30° C. for 0.5 h to obtain a first mixed solution;

S3. dissolving 1.2 g of sodium hydroxide (alkali) and 2.5 g of sodium metaaluminate (aluminum source) in 12 mL of deionized water, and stirring at 30° C. for 0.5 h to obtain an aluminum alkali solution; mixing 6 g of silica sol (silicon source) with 15 mL of deionized water and stirring at 30° C. for 0.5 h to obtain a silicon source solution; mixing the aluminum alkali solution and the silicon source solution, and stirring at 30° C. for 0.5 h to obtain a molecular sieve precursor solution; and mixing the molecular sieve precursor solution with the first mixed solution, and stirring at 30° C. for 3 h to obtain a second mixed solution;

S4. carrying out hydrothermal crystallization reaction on the second mixed solution at 100° C. for 4 h to obtain a suspension; and S5. using water as a centrifugal washing solvent, centrifugally washing the suspension for 5 times, where the centrifugal rotation speed is 4000 rpm, and the centrifugal washing time is 5 min each time; then, drying the solid product obtained by centrifugal washing (pH 8-10 detected by pH test paper) in the air atmosphere of 100° C., grinding in a mortar for 5 min, and calcining the ground sample in an air atmosphere at 550° C. for 6 h at a heating rate of 2° C./min, to obtain a catalyst (the Ir loading in the catalyst prepared in this embodiment is 0.80 wt. % by ICP test).

Comparative Example 3

S1. dissolving 1 g of chloroiridium hexahydrate (with an Ir content of 39 wt. %) in water to prepare 100 mL chloroiridium solution;

S2. mixing 11.50 mL of chloroiridium acid solution with 0.258 g of (3-aminopropyl) trimethoxysilane, and stirring at 30° C. for 0.5 h to obtain a first mixed solution;

S3. dissolving 1.2 g of sodium hydroxide (alkali) and 2.5 g of sodium metaaluminate (aluminum source) in 12 mL of deionized water, and stirring at 30° C. for 0.5 h to obtain an aluminum alkali solution; mixing 6 g of silica sol (silicon source) with 15 mL of deionized water and stirring at 30° C. for 0.5 h to obtain a silicon source solution; mixing the aluminum alkali solution and the silicon source solution, and stirring at 30° C. for 0.5 h to obtain a molecular sieve precursor solution; and mixing the molecular sieve precursor solution with the first mixed solution, and stirring at 30° C. for 3 h to obtain a second mixed solution;

S4. carrying out hydrothermal crystallization reaction on the second mixed solution at 100° C. for 4 h to obtain a suspension; and S5. using water as a centrifugal washing solvent, centrifugally washing the suspension for 5 times, where the centrifugal rotation speed is 4000 rpm, and the centrifugal washing time is 5 min each time; then, drying the solid product obtained by centrifugal washing (pH 8-10 detected by pH test paper) in the air atmosphere of 100° C., grinding in a mortar for 5 min, and calcining the ground sample in an air atmosphere at 550° C. for 6 h at a heating rate of 2° C./min, to obtain a catalyst (the Ir loading in the catalyst prepared in this embodiment is 0.83 wt. % by ICP test).

According to the relative content ratios of active sites $Ir^0$ and $Ir^{\delta+}$ in the Embodiments and Comparative Examples in Table 1, it may be seen that the ratio of $Ir^0$ and $Ir^{\delta+}$ changes regularly with the changes of the dosage of the first metal precursor solution, the second metal precursor solution, the first ligand and the second ligand. With the decrease of the dosage of the first ligand and the corresponding coordinated first metal precursor solution, the proportion of $Ir^0$ gradually increased.

2. CO-SCR Reaction Performance Test testing 0.25 g of the catalysts prepared in Embodiments 1-3 and Comparative Examples 1-3 respectively, and the methods are as follows:

placing the catalyst in a fixed reactor with NO concentration of 400 parts per million (ppm), CO concentration of 8000 ppm, $O_2$ concentration of 5 volume percentage (vol. %), $SO_2$ concentration of 100 ppm, $N_2$ as equilibrium gas and space velocity of 10,000 h-1. The nitrogen oxide conversion rate of the catalyst is tested at different reaction temperatures, and the results are shown in Table 2.

Before the formal performance test, all catalysts are pretreated, and the pretreatment steps are as follows:

The catalyst is pretreated at 200° C. in 5 vol. % $H_2$ gas flow ($N_2$ as equilibrium gas) for 30 min to improve its catalytic activity. The calculation method of nitrogen oxide ($NO_x$) conversion rate ($\mu_{NO_x}$) in Table 2 is shown in Formula 1-1. In the experiment, the real-time change of gas concentration is measured by Bruker Tensor II infrared spectrum, and the product of complete catalytic reduction is $N_2$.

$$\mu_{NO_x} = \left[\frac{NO(in) - NO(out) - N_2O(out) - NO_2(out)}{NO(in)}\right] \times 100\% \quad (1\text{-}1)$$

TABLE 2

| | Conversion rate of nitrogen oxides at different reaction temperatures (%) | | | | | | |
|---|---|---|---|---|---|---|---|
| Sample | 150° C. | 175° C. | 200° C. | 225° C. | 250° C. | 275° C. | 300° C. |
| Embodiment 1 | 3.27 | 4.48 | 9.09 | 41.78 | 56.46 | 66.68 | 39.23 |
| Embodiment 2 | 3.91 | 9.43 | 12.58 | 77.43 | 80.06 | 72.67 | 45.75 |
| Embodiment 3 | 8.23 | 6.60 | 6.69 | 46.43 | 56.69 | 79.57 | 44.16 |
| Comparative Example 1 | 0.00 | 0.00 | 0.00 | 0.01 | 0.05 | 0.09 | 0.03 |
| Comparative Example 2 | 3.91 | 4.03 | 5.53 | 35.95 | 41.19 | 52.54 | 39.59 |
| Comparative Example 3 | 2.22 | 3.75 | 3.65 | 24.69 | 73.27 | 45.36 | 38.44 |

Effect Verification

1. XPS Test

The catalysts prepared in Embodiments 1-3 and Comparative Examples 1-3 are tested by XPS, and the ratio of $Ir^{\delta+}$ to $Ir^0$ (mass ratio, percent (%)) is detected. The results are shown in Table 1.

TABLE 1

| Sample | $Ir^{\delta+}/(Ir^{\delta+} + Ir^0)$ (%) | $Ir^0/(Ir^{\delta+} + Ir^0)$ (%) |
|---|---|---|
| Embodiment 1 | 81.77 | 18.23 |
| Embodiment 2 | 49.88 | 50.12 |
| Embodiment 3 | 31.21 | 68.79 |
| Comparative Example 1 | — | — |
| Comparative Example 2 | 89.46 | 10.54 |
| Comparative Example 3 | 27.64 | 72.36 |

Table 2 shows the conversion rates of nitrogen oxides of the catalysts prepared in Embodiments 1-3 and Comparative Examples 1-3 at different temperatures under the conditions of $O_2$ concentration of 5 vol. % and $SO_2$ concentration of 100 ppm. It may be seen that the conversion rate of $NO_x$ in Comparative Example 1 is about 0 in all the reaction processes, indicating that the catalytic activity of the molecular sieve carrier itself for CO-SCR reaction is extremely low, and the main role is the Ir active site. Compared with Comparative Example 1, the catalysts prepared in Embodiments 1-3 of the present disclosure have remarkable catalytic activity, and with the increase of the relative content of $Ir^0$, the conversion first increases and then decreases, showing a volmayic change. As may be seen from Table 1, the overall catalytic activity is the highest when the ratio of $Ir^0$ to $Ir^{\delta+}$ is about 1:1, and the temperature ($T_{50}$) is the lowest when the conversion rate of $NO_x$ reaches 50%. When only the first ligand (Comparative Example 2) or the second ligand (Comparative Example 3) is used to coordinate with metal Ir, the technical effect that may be achieved by the embodiment of this application may not be achieved, which further shows that the appropriate relative content ratio of $Ir^0$ to $Ir^{\delta+}$ may effectively promote the increase of the number of active sites, thus improving the catalytic performance of the catalyst.

3. XRD Test

FIG. 1 is the XRD spectrum of catalysts prepared in Embodiment 3 and Comparative Example 1 (where Ir@A stands for Embodiment 3 and Azeolite stands for Comparative Example 1). Compared with the standard spectrum, both Embodiment 3 (i.e. Ir@A) and Comparative Example 1 (i.e. Azeolite) have the characteristic peaks of type A molecular sieve, indicating the successful synthesis of the carrier, and the introduction of Ir does not damage the molecular sieve structure. In Embodiment 3 (Ir@A), no obvious Ir characteristic peak is observed, indicating Ir is uniformly dispersed on the carrier. Embodiment 1, Embodiment 2 and Embodiment 3 have the same silicon-aluminum ratio and hydrothermal crystallization reaction time in the preparation process, and the types of the obtained molecular sieve carriers are the same. After testing, the XRD spectra of the catalysts prepared in Embodiment 1 and Embodiment 2 are consistent with those in Embodiment 3, so they are not repeated.

4. Morphology Characterization of Catalyst

Taking the catalysts prepared in Embodiments 1-3 and Comparative Examples 2-3, carrying out TEM experiments, randomly selecting the sizes of 100 nanoclusters, and making the particle size distribution map.

Figure 2:
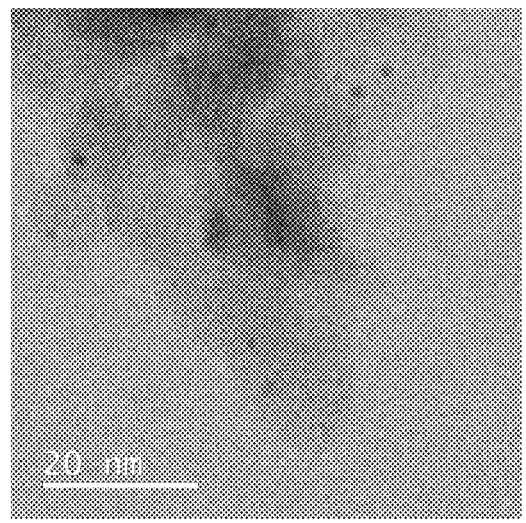
FIG. 2 is a TEM image of the catalyst prepared in Embodiment 3.
Figure 4:
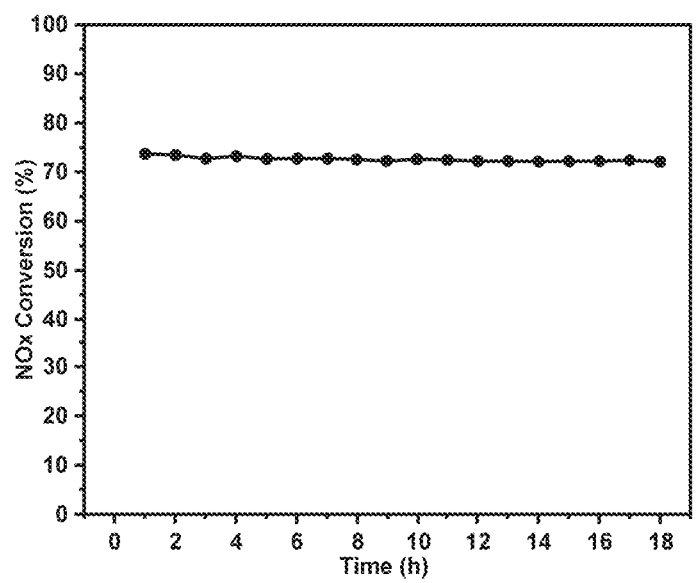
FIG. 4 shows the stability test results of the catalyst prepared in Embodiment 3.

FIG. 2 is a TEM image of the catalyst prepared in Embodiment 2, and FIG. 4 is a particle size distribution diagram of Ir nanoclusters in the catalysts prepared in Embodiments 1-3 and Comparative Examples 2-3. From the TEM images, it may be seen that Ir nanoclusters are uniformly dispersed on the molecular sieve carrier. It may be seen from the particle size distribution diagram that the size of Ir clusters is mainly in the range of less than 0.8 nm and 1-2 nm. In Embodiments 1-3, the proportion of clusters with particle size of 1-2 nm increased gradually, and the proportion of clusters with particle size less than 0.8 nm decreased in turn. The particle size of Ir clusters in the catalyst of Comparative Example 2 is mainly concentrated in the range of less than 0.8 nm, which shows that its particle distribution is smaller and more concentrated. The Ir clusters of the catalyst in Comparative Example 3 are highly concentrated in the range of 1-2 nm (the proportion is close to 90%), while the proportion of Ir clusters smaller than 0.8 nm is less. And with the different proportion of the two ligands, the proportion of clusters with different sizes is different, and the proportion of clusters with different sizes is basically consistent with the proportion trend of $Ir^{\delta+}$ and $Ir^0$ (XPS results).

Figure 3:
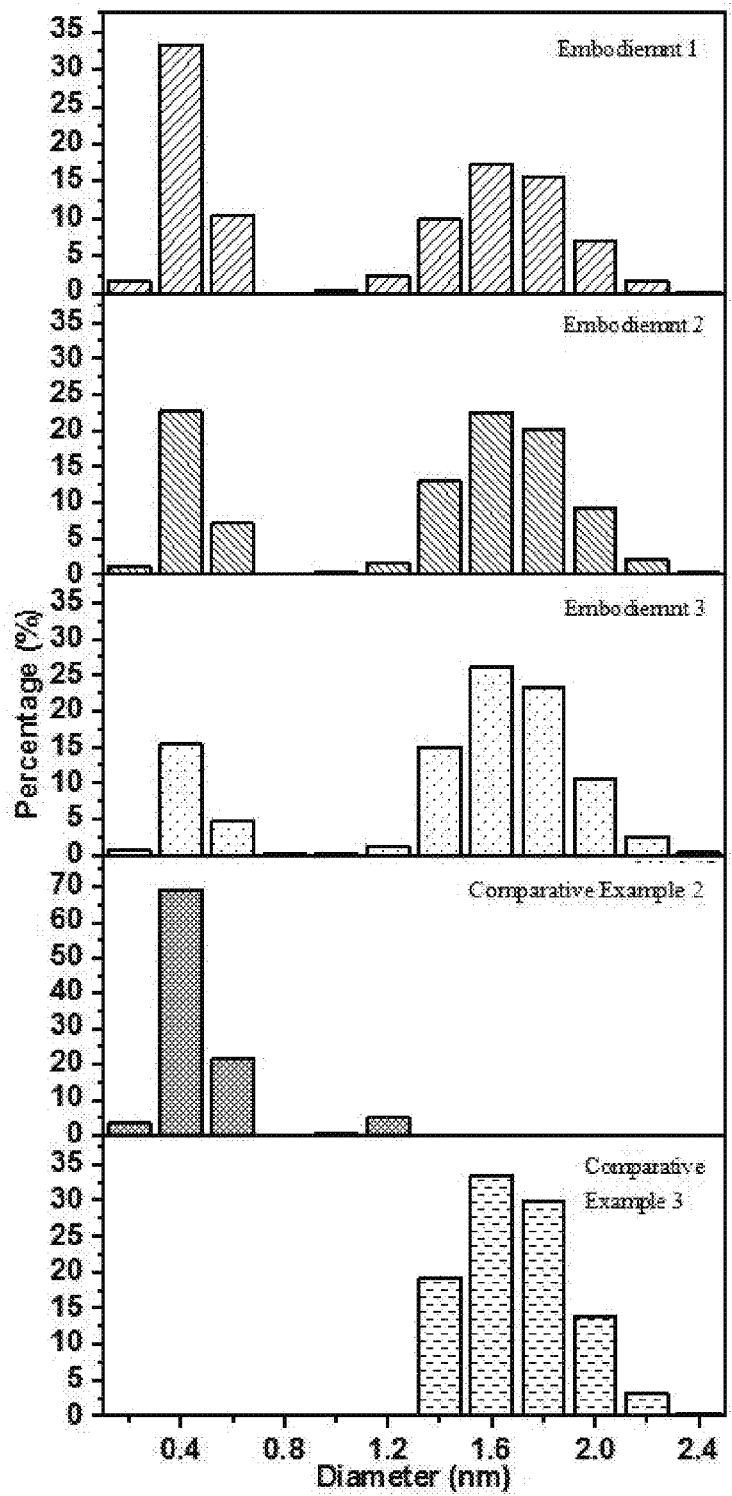
FIG. 3 is a graph showing the particle size distribution of Ir nanoclusters in the catalysts prepared in Embodiments 1 to 3 and Comparative Examples 2 to 3.

5. Stability Test 0.25 g of the catalyst prepared in Embodiment 2 is tested under the following conditions:

the catalyst is placed in a fixed reactor with NO concentration of 400 ppm, CO concentration of 8000 ppm, $O_2$ concentration of 5 vol. %, $SO_2$ concentration of 100 ppm, $N_2$ as equilibrium gas, and space velocity of 10,000 $h^{-1}$. The nitrogen oxide conversion rate of the catalyst is tested at 250° C., and the results are shown in FIG. 3.

Before the formal performance test, all catalysts are pretreated, and the pretreatment steps are as follows:

the catalyst is pretreated at 200° C. in 5 vol. % $H_2$ gas flow ($N_2$ as equilibrium gas) for 30 min to improve its catalytic activity. The calculation method of nitrogen oxide ($NO_x$) conversion ($\mu_{NOx}$) in FIG. 3 is shown in Formula 1-1.

FIG. 4 is the result of the stability experiment of the catalyst prepared in Embodiment 3. As may be seen from FIG. 4, the activity of the catalyst is basically not lost within 18 h, and the catalytic activity is relatively stable.

6. Activity Test of Catalyst Under Different Concentration Ratios of $SO_2$ and $O_2$ 0.25 g of the catalyst prepared in Embodiment 3 is tested under different $SO_2$ concentrations, as follows:

the catalyst is placed in a fixed reactor with NO concentration of 400 ppm, CO concentration of 8000 ppm, $O_2$ concentration of 5 vol. %, $SO_2$ concentration of 0, 100, 200, 300 and 400 ppm, $N_2$ as equilibrium gas, temperature of 250° C. and space velocity of 10,000 $h^{-1}$. The nitrogen oxide conversion rate of the catalyst is tested at different reaction temperatures, and the results are shown in Table 3.

Before the formal performance test, all catalysts are pretreated, and the pretreatment steps are as follows:

the catalyst is pretreated at 200° C. in 5 vol. % $H_2$ gas flow ($N_2$ as equilibrium gas) for 30 min to improve its catalytic activity. The calculation method of nitrogen oxide ($NO_x$) conversion rate (UNOx) in Table 3 is the same as that in Formula 1-1.

TABLE 3

| $SO_2$ concentration (ppm) | 0 | 100 | 200 | 300 | 400 |
|---|---|---|---|---|---|
| $O_2$:$SO_2$ | — | 500 | 250 | 166.67 | 125 |
| $NO_x$ Conversion | 12.54 | 80.06 | 75.26 | 61.25 | 41.38 |

Table 3 shows the $NO_x$ conversion rate of the catalyst prepared in Embodiment 3 at different concentrations of $SO_2$. In the presence of $SO_2$, the activity of the catalyst is better than that without $SO_2$. With the increase of $SO_2$ concentration, the conversion of $NO_x$ first increased and then decreased. Among them, when the concentration of $SO_2$ is 100 ppm, the conversion rate of $NO_x$ is the highest, which shows that the catalyst may maintain good activity at an appropriate $O_2$:$SO_2$ ratio.

The above-mentioned embodiments only describe the preferred mode of the disclosure, and do not limit the scope of the disclosure. Under the premise of not departing from the design spirit of the disclosure, various modifications and improvements made by ordinary technicians in the field to the technical scheme of the disclosure shall fall within the protection scope determined by the claims of the disclosure.

What is claimed is:

1. A molecular sieve confined noble metal catalyst for CO-SCR denitrification, wherein the molecular sieve confined noble metal catalyst consists of a molecular sieve carrier and Ir metal nanoclusters loaded in the molecular sieve carrier through confined encapsulation;

the molecular sieve carrier is an A-type molecular sieve, an X-type molecular sieve or a Y-type molecular sieve;
a loading of the Ir metal nanoclusters in the molecular sieve confined noble metal catalyst is 0.1-1 wt. %; and
a particle size of the Ir metal nanoclusters is ≤2 nm, and the Ir metal nanoclusters comprise an oxidized state of $Ir^{\delta}+$ and a metallic state of $Ir^0$, wherein a proportion of the $Ir^0$ is 10-70 wt. %;

wherein the molecular sieve confined noble metal catalyst is prepared by a method comprises the following steps:

mixing a first metal precursor solution with a first ligand, and stirring to obtain a first mixed solution;

mixing a second metal precursor solution with a second ligand, and stirring to obtain a second mixed solution;

mixing silicon source, aluminum source, alkali and solvent, and stirring to obtain molecular sieve precursor solution; mixing the molecular sieve precursor solution with the first mixed solution and stirring, then adding the second mixed solution and stirring to obtain a third mixed solution; carrying out hydrothermal crystallization reaction on the third mixed solution, and after finishing the hydrothermal crystallization reaction, carrying out centrifugal washing, drying and calcining to obtain the molecular sieve confined noble metal catalyst for the CO-SCR denitrification; wherein the first metal precursor solution and the second metal precursor solution are both Ir salt solutions; and the first ligand is a C1-6 linear amine compound; the second ligand is alkoxy silane containing sulfhydryl or amino group.

2. The molecular sieve confined noble metal catalyst for CO-SCR denitrification according to claim 1, wherein a solute of the Ir salt solution comprises at least one of iridium nitrate, iridium acetate or iridium chloride acid, and a solvent of the Ir salt solution is water.

3. The molecular sieve confined noble metal catalyst for CO-SCR denitrification according to claim 1, wherein the aluminum source comprises at least one of sodium metaaluminate, boehmite, pseudo-boehmite, amorphous aluminum hydroxide powder or aluminum isopropoxide; the silicon source comprises at least one of water glass, silica sol, silica gel or amorphous $SiO_2$ powder; and the alkali is at least one of NaOH or KOH.

4. The molecular sieve confined noble metal catalyst for CO-SCR denitrification according to claim 1, wherein a molar ratio of Ir salt of the Ir salt solution to the first ligand in the first mixed solution is 1:3-8, based on Ir; and a molar ratio of the Ir salt to the second ligand in the second mixed solution is 1:6-12.

5. The molecular sieve confined noble metal catalyst for CO-SCR denitrification according to claim 1, wherein the silicon source is calculated as $SiO_2$, the aluminum source is calculated as $Al_2O_3$, the alkali is calculated as at least one of $Na_2O$ or $K_2O$, Ir salt of the Ir salt solution is calculated as Ir, and a molar ratio of the silicon source, the aluminum source, the alkali, the Ir salt, the first ligand and the second ligand in the third mixed solution is 1-8:1: 1-4:0.003-0 0.020:0.001-0.16:0.001-0.24.

6. The molecular sieve confined noble metal catalyst for CO-SCR denitrification according to claim 1, wherein a temperature of the hydrothermal crystallization reaction is 80-120° C. and a time is 3-48 h; a drying temperature is 80-120° C.; and a calcination temperature is 400-600° C., a time is 4-8 h, and a heating rate is 1-10° C./min.

* * * * *